March 14, 1967     G. K. C. HARDESTY     3,308,785

PANEL MOUNTED METER AND ACCESSORY ILLUMINATION SYSTEM

Filed Jan. 30, 1963     4 Sheets-Sheet 1

INVENTOR.
GEORGE K. C. HARDESTY
BY
ATTORNEYS

March 14, 1967     G. K. C. HARDESTY     3,308,785
PANEL MOUNTED METER AND ACCESSORY ILLUMINATION SYSTEM
Filed Jan. 30, 1963     4 Sheets-Sheet 2

INVENTOR.
GEORGE K. C. HARDESTY
BY
ATTORNEYS

March 14, 1967  G. K. C. HARDESTY  3,308,785
PANEL MOUNTED METER AND ACCESSORY ILLUMINATION SYSTEM
Filed Jan. 30, 1963  4 Sheets-Sheet 4

INVENTOR.
GEORGE K.C. HARDESTY
BY Donald A. Kaul
B. L. Zangwill
ATTORNEYS

United States Patent Office 3,308,785
Patented Mar. 14, 1967

3,308,785
PANEL MOUNTED METER AND ACCESSORY
ILLUMINATION SYSTEM
George K. C. Hardesty, Box 156, Mayo, Md. 21106
Filed Jan. 30, 1963, Ser. No. 255,133
15 Claims. (Cl. 116—129)

The invention described herein may be manuufactured and used by or for the Government of the United States of America for governmental purposes without the payment of any royalties thereon or therefor.

This invention relates to illumination means for panel mounted meters and accessories and more particularly it relates to illuminating the scale of a panel mounted meter and to illuminating knobs, switches or other accessories mounted in the panel by means of edge lighting.

Edge lighting refers to panel illumination wherein one or more light sources are located at or near an edge of a transparent panel to introduce light rays into the panel for transillumination thereof and indirect illumination thereby. The light sources can be tungsten filament lamps, fluorescent lamps, neon or other gaseous lamps, or electroluminescent means. The light sources may also be embedded in or otherwise made integral with the panel without departing from the scope of edge lighting as the term is defined herein.

Generally, edge illumination lighting systems are well known for illuminating either the location of components or the indicia upon such components or both. In the past, such illumination has occurred by passing light through a light transmission panel to apertures surrounding the gages, meters or other illuminating instruments whereby light shining from the aperture edges enters the viewing window and illuminates the indicia on the opaque face of the instrument in a manner such as that taught by Dmitriev et al. in U.S. Patent No. 2,838,830, or by passing light through a light transmission panel located behind the indicia to be illuminated in a manner such as that taught in applicant's U.S. Patents Nos. 2,886,911 and 2,945,313, and as often practiced in conjunction with piped-light plastic pointers that enable the pointer tip to be as brightly visible as the indicia when the instrument is viewed in darkness.

The applicant's prior illumination means are satisfactory for lighting an instrument but they involve putting the illumination panel in the instrument itself. In contradistinction to this, the present invention involves putting an instrument, such as a meter, in the illuminated panel and conveying light to the scale and pointer of the meter by virtue of the transparency of the case of the meter. Among other advantages, this invention permits isolation of the heat from the illumination means. Many manufacturers have found that even 0.3 to 1 watt of lamp energy dissipated in the casing of an electronic meter will cause serious loss of function or accuracy. The present invention, in contrast with the integral lamp approach, permits the lamps to be quite remote from the meter, thus minimizing the aforementioned adverse effects of heat dissipation from said lamps.

Furthermore, the present invention is easily adaptable for use with the basic designs of many meters already on the market. Many such meters are already manufactured with transparent casings for reasons of sales appeal rather than for any technical reasons and would need only minor changes and the provision of transparent dial plates to function with or as a part of the invention.

In certain situations, it may be desirable to illuminate a meter in an electronic control console or in an electronic test equipment having a metal face viewing panel or operator's control surface without having to replace the entire metal face with an illuminated panel. Using the principles of the present invention, a small illuminated panel can be installed immediately under or surrounding one or more of the meters and thus their scales can be illuminated for viewing in darkness or low levels of general illumination without substantially modifying the console itself.

The present invention also provides means for illuminating opaque panel mounted accessories or "standard electronic hardware" such as knobs, buttons, switches and the like. Such accessories have been neglected or avoided by the prior art to such an extent that, during periods of darkness, it is difficult to locate and operate even the simplest "toggle-switches" so widely used in electronic control equipment. In accordance with the present invention, such accessories are provided with translucent bushings so the light conducted through the panel illuminates the bushings and unmistakably delineates the location of such accessories. It is even possible to make certain parts of the accessories themselves out of translucent material so that they will be particularly suited for illumination.

In accordance with the above principles, it is an object of the present invention to provide a coordinated, efficient and practical system of illuminating electronic and other control panels by utilizing an edge illuminated light transmission panel wherein elements of translucent material surrounding or forming a portion of the panel components are mounted within said panel to the end that, not only the legends, scales and markings on said panel, but also said elements of translucent material are rendered usefully and compatibly luminous through utilization of light taken from a common source or sources and transmitted through said edge illuminated panel, thus enabling the brightness of all illuminated elements and panel markings to be regulated through the use of single dimming control device.

A further object of this invention is to avoid the heating of manually operated illuminated controls which in the past caused discomfort to the operators or in extreme cases, as in the integral-lamp type controls, made the controls so hot that it was impossible for the operator to touch them them without burning his hands.

Another object of this invention is to avoid electrical complexity, to increase overall reliability by isolating the lighting and control circuits, and to achieve a more economical design.

Still a further object of this invention is to provide an improved means for illuminating a meter mounted in a switchboard or metal control console without replacing or substantially altering the metal face plate of the console.

Yet another object of this invention is to provide an illumination system for panel mounted meters which is especially adapted for use with the basic designs of commercially available meters having transparent or translucent cases.

A further object of this invention is to provide illumination means in the form of an edge illuminated panel which is adapted to illuminate meters and other accessories mounted therein by taking advantage of their translucent properties and to provide translucent, illuminable accessories which can adapt standard electronic components for use in this panel.

A still further object of this invention is to provide individual edge lighted accessory-panels which may be specially made for use with meters that mount on metal panels and which possess the advantage that the lamps may be removed and replaced without hazardous opening of the meter case, as was previously required.

Other objects, and advantages and salient features of the present invention will become apparent from the following description, taken in connection with the accompanying drawings, which illustrate a preferred embodiment, in which.

Figure 1:
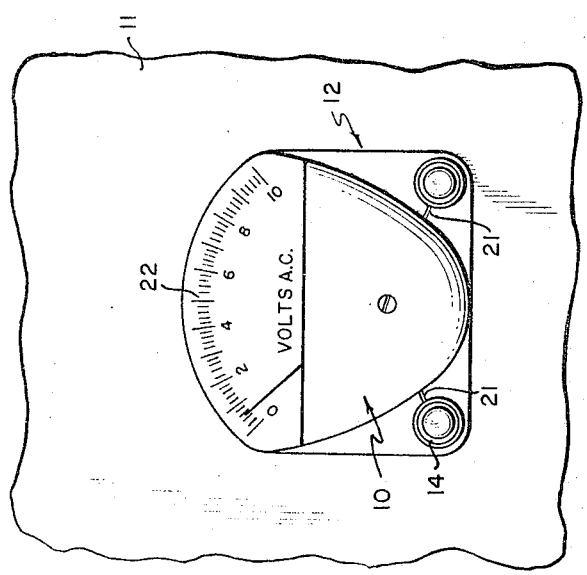
FIG. 1 is a front elevational view of a particularly flat form of printed circuit indicating meter currently commercially available, said meter being mounted on a fragmentary metal console panel and provided with an accessory illuminating device.

Referring now to the drawings, FIG. 1 shows a particularly flat form of printed circuit indicating meter 10, of the commercially available type, being mounted on the face of a meter console panel 11. Interposed between the meter 10 and the panel 11 is an accessory illuminating device, generally indicated as 12, which is shown in greater detail in FIG. 2. The accessory illuminating device 12 includes a light transmitting or conducting sheet 13, of a material which will be presently described with reference to the more elaborate embodiments, and a pair of front accessible illumination lamps and sockets 14, of any suitable design, such as those used in commercial edge lighting or military aircraft panels. Wires 21 interconnect the lamps 14 to a pair of lamp terminals 15 which extends rearwardly through apertures in the console panel 11 and connect to a suitable source of power.

The light transmitting panel 13 is coated on its front, back and edge surfaces with a light diffusing white coating 16, such as white paint. The front surface of the panel 13 is provided with a clear unpainted portion of the approximate shape of the meter 10, but slightly smaller to prevent the escape of annoying light. On the rear surface of the panel 13, the coating 16 extends behind a part of the clear unpainted portion for the purpose of diverting light from the panel 13 into the rear of the scale of the meter 10 for illumination thereof. The total exterior surface of the coating 16 is covered with an opaque coating 17, such as black paint. Coatings 16 and 17 have been shown exaggerated in thickness in FIG. 2.

The meter 10 is provided a pair of screw means 18 which act both as meter circuit terminals and as meter mounting means. The screw means 18 extend through a pair of apertures 19 in the accessory illuminating device 12 and through another pair of apertures 20 in the console panel 11, thereby mounting both the meter 10 and its illuminating device 12 to the console panel 11.

Figure 2:
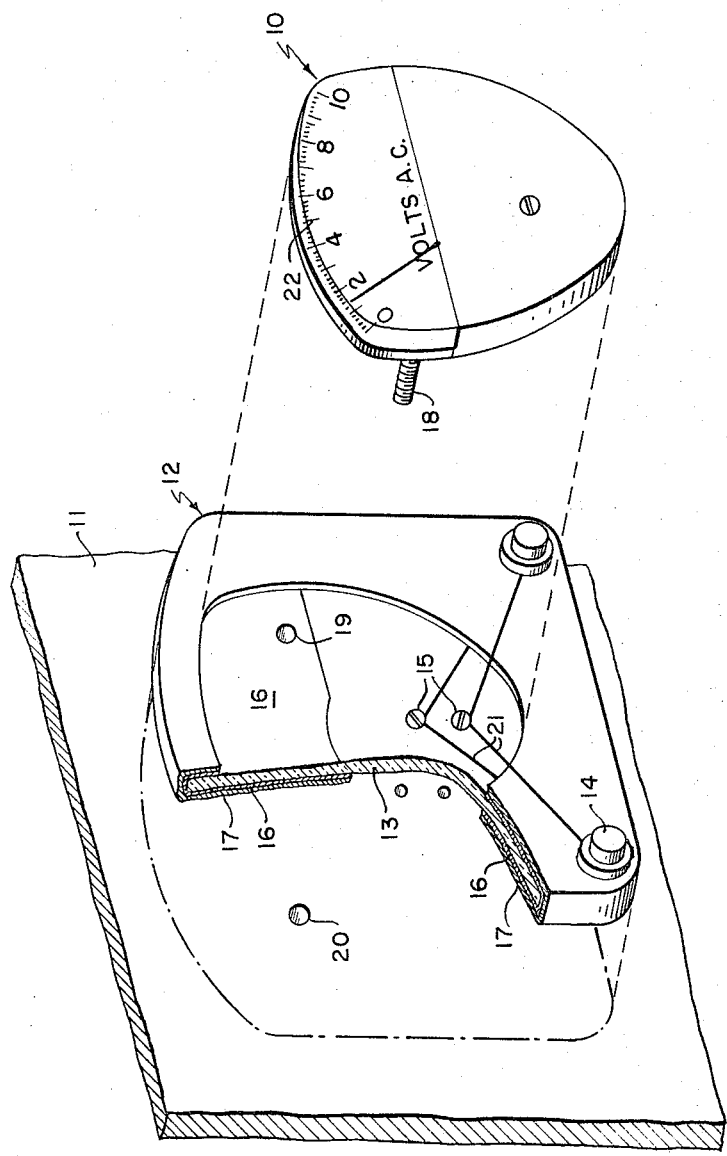
FIG. 2 is an expanded pictorial view of the set-up of FIG. 1 with a portion of the accessory illuminating device being broken away.
Figure 3:
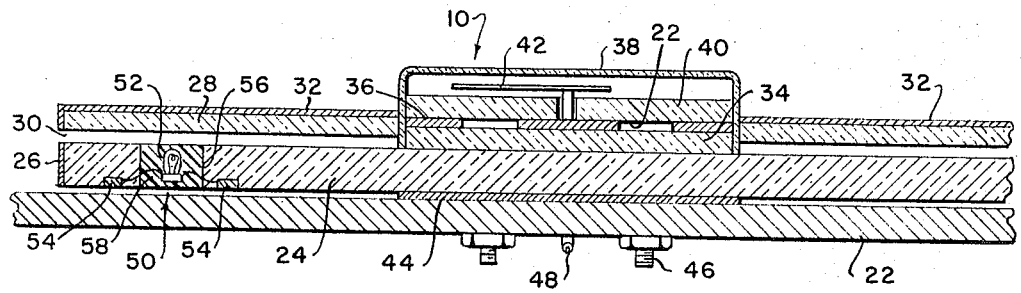
FIG. 3 is a fragmentary transverse sectional view of the flat form of meter shown in FIG. 1 as mounted on a larger panel and utilizing a duo-panel illumination system.

FIG. 3 may be taken as generally illustrative of a means of mounting a flat meter 10, such as that of FIGS. 1 and 2, to a metal console panel 22, and using a duo-panel illumination system to illuminate the scale of said meter. The duo-panel illumination system includes a light transmitting or light conducting member 24 made of a highly transparent sheet or plate of suitable size, having its front and back surfaces in substantially parallel relation to each other and preferably polished to provide smooth optical surfaces for total internal specular reflection of light therebetween. The panel 24 is similar to the aforementioned panel 13 and is fabricated from a thermoplastic polystyrene co-polymer, or a methyl methacrylate plastic material such as, for example, commercial "Lucite" or "Plexiglass." A light diffusing coating 26 covers the edges of the panel 24 to prevent lateral light leakage.

A translucent light diffusing member or panel 28, made preferably of a white plastic material, is juxtaposed to the light conducting panel 24. The light diffusing panel 28 is optically separated from the light conducting panel 24 by suitable means such as an air space 30 which is slightly exaggerated in size in FIG. 3. The light diffusing member 28 is provided with a central aperture which may be large enough for reception of the meter 10, as shown, or may be somewhat smaller in which case the periphery of the meter would rest on the periphery of the aperture. An opaque lamination or coating 32, preferably black, is superimposed upon the entire forward and side edge surfaces of the light diffusing panel 28.

The meter 10 includes a base plate 34 of transparent light transmitting material, preferably the same material as panel 24. The front surface of the base plate 34 is provided with a pair of lugs or bosses 36 shown in section in FIG. 3 having a lateral extent exceeding the basic boundary edges of the face plate 34 and thus providing lug portions for engaging a meter cover 38. The cover 38 is generally fabricated of transparent material to permit observation of the meter scale. The bezel of the meter cover 38 snaps over the lugs 36 thus mounting the cover within the central aperture of the light diffusing member 28. The scale member for the meter is in the form of an indicia-bearing panel 40 which is juxtaposed to the base plate 34. The meter scale is formed of translucent light diffusing material, preferably the same white plastic used for the light diffusing member 28, and the indicia 22 which comprises the scale are formed on the obverse surface of the scale 40. The meter is of the type having a very thin printed circuit inductive coil means which are connected to a pointer 42 which moves across indicia on the meter scale 40 by electromagnetic movement relative to a permanent-magnet maintained magnetic field. A light diffusing patch 44, of approximately the same size and shape as the scale member 40, is placed in optical contact with the back surface of the light conducting panel 24. Suitable combined meter circuit terminals and meter-to-panel attachment means such as screw means 46 attach the meter 10 and its attendant illumination means to the metal console panel 22. Insulating bushings, not shown, prevent the meter terminals 46 and the illumination lamp terminals 48 from shorting to the metal panel 22. The illumination lamp circuit terminals 48 extend through the metal console panel 22 and are adapted to be connected to a suitable source of power.

A light producing source generally indicated as 50 is provided to transmit light through the duo-panel system of FIG. 3 to thereby illuminate the meter scale 40. The light producing means 50 includes a lamp 52 of approximately ⅛ inch or less diameter, commonly known in the industry as a "grain of rice" lamp. This lamp 52 can be attached to terminals 54 which can be mounted on or embedded in the rear surface of the light conducting panel 24. The lamp 52 is mounted within an aperture or void 56 in the light conducting panel 24. The void 56 can be filled with transparent potting compound 58, either colored or colorless, preferably a silicone gel or some other nearly rigid composition. It should be understood that any number of lamps 52 may be used to produce the illumination required. Thus, though the device as shown in FIG. 1 is provided with only two lamps, it could as readily have four lamps one located in each corner, or any other number of lamps dependent upon the environmental requirements.

Figure 4:
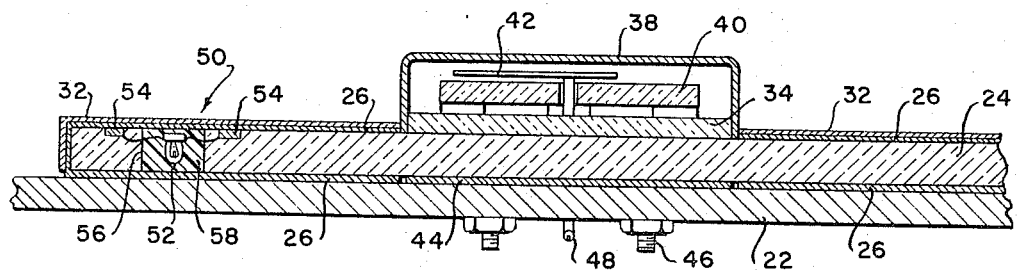
FIG. 4 is a view similar to that of FIG. 3, but utilizing a uni-panel illumination system.

FIG. 4 shows a meter and illumination system quite similar to that shown in FIG. 3, however, a uni-panel illumination system is used in FIG. 4. Thus, in the embodiment shown in FIG. 4, the opaque coating 32 is applied directly to the front and side surfaces of the light conducing panel 24, and no light diffusing panel such as panel 28 in FIG. 3 is needed. The base plate 34 of the meter is mounted within an aperture portion in the opaque coating 32 and is thus in contact with the front surface of the light conducting panel 24. An alternate method of mounting the meter cover 38' has been shown in FIG. 4 wherein the bezel of the cover 38' snaps directly over the periphery of the base plate 34. The light producing source 50 has also been shown in an alternative manner with the terminals 54 being embedded in the front surface of the light conducting panel 24. Operation of the system as shown in FIG. 4 is identical to that shown in FIG. 3. Thus, when the lamp or lamps 52 are energized, light rays pass therefrom into the light conducting panel 24 wherein at least a substantial number of the light rays are diffusely reflected between the coated front and rear surfaces of panel 24 by internal diffuse reflection. Certain of these light rays, and others directly transmitted through the panel 24, fall on a light diffusing path 44, which may be a separate patch or may be a part of the diffusing coating 26 rather than a diffusing panel such as panel 28 in FIG. 3 which has been shown in FIG. 4 as not only covering the edges of the panel, but also the front and rear surfaces thereof. The light rays falling upon the patch 44 are further reflected through the uncoated aperture in the panel 24 and through the base plate 34 and hence into the light diffusing scale member 40 for illuminating the indicia carried thereon and thus silhouetting the pointer which cooperates therewith.

Figure 5:
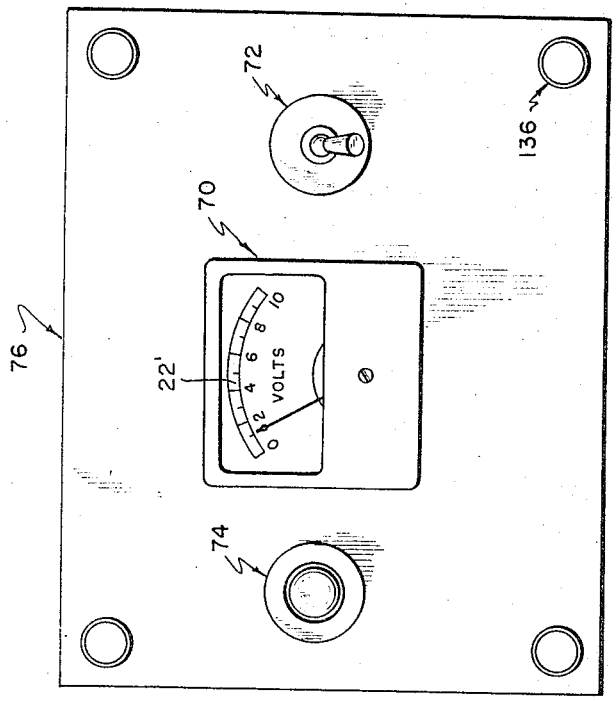
FIG. 5 is a front elevational view of a meter and accessories mounted in a duo-panel illumination system which illuminates both the meter and the accessories, and in which some of the proportions are exaggerated for purposes of clarity of relationships.
Figure 6:
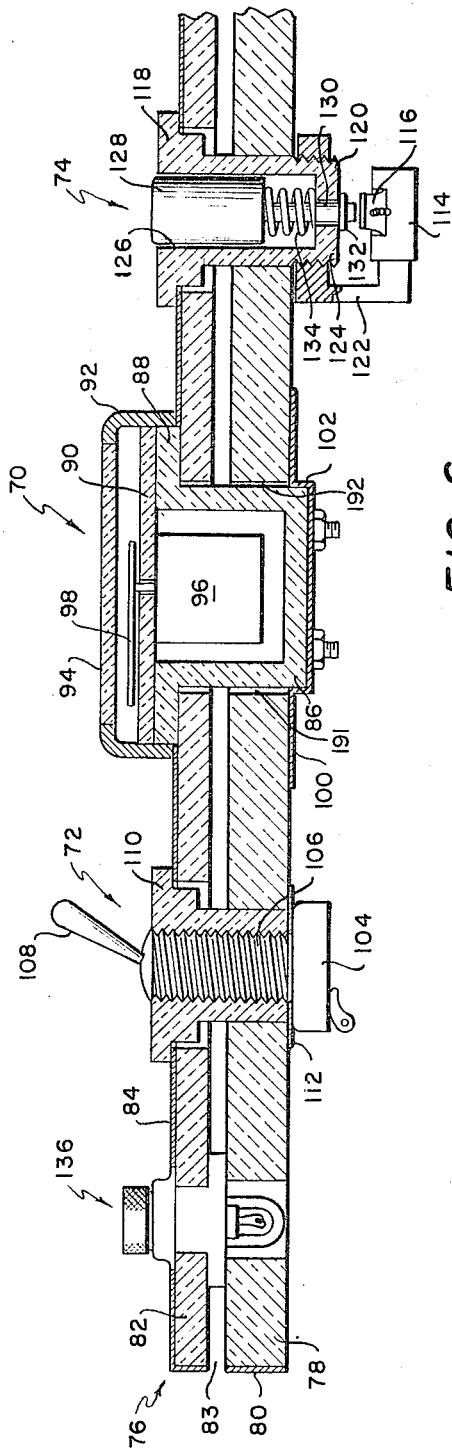
FIG. 6 is a fragmentary transverse sectional view of the illumination system of FIG. 5, and also having some exaggerated proportions.

FIG. 5 shows a modified form of the invention in which a meter generally indicated at 70 and accessories in the form of a switch generally indicated at 72 and a push button generally indicated at 74 are mounted in a duo-panel illumination means generally indicated at 76. FIG. 6 shows the illumination system of FIG. 5 in greater detail. The duo-panel 76 includes a light-transmitting or conducting member or panel 78 made of a highly transparent sheet or plate of suitable size, having its front and rear surfaces in substantially parallel relationship to each other, and preferably polished to provide smooth optical surfaces for total internal specular reflection of light therebetween. The light conducting panel 78 can be fabricated of the same material as the panel 24. A light diffusing coating 80 is provided at the side edges of the panel 78 to prevent lateral light leakage. The duo-panel also includes a sheet or indicia panel 82 of light diffusing material, preferably a white plastic similar to that of plate 28, that is mounted in a juxtaposed relationship to the front surface of the light conducting panel 78. The panels 78 and 82 are optically separated by suitable means such as an air space 83 shown exaggerated in size in FIG. 6. An opaque lamination or coating 84, preferably black, is superimposed on the entire front and side edge surfaces of the light diffusing panel 82.

Coaxially aligned central apertures 191, 192 are provided in the panels 78 and 82 for reception of the meter member 70. The meter 70 includes a cup-shaped translucent housing 86 made of glass or like material, having an integral annular flange portion 88 of greater lateral extent than the central apertures, and having its cup-shaped portion extending through the apertures and beyond the rear surface of the light conducting panel 78. A meter scale 90 in the form of an indicia-bearing panel is affixed to the annular flange 88 by any suitable means, and is formed of translucent light diffusing material such as white plastic. The meter 70 is also provided with an opaque cover 92 for the scale member 90, having a transparent window 94 therein for viewing the indicia on the scale member 90. The bezel of the cover 92 fits over the edge of the annular flange 88 in abutting relationship.

The working parts of the meter, denoted as 96, are contained within the cup-shaped body member 86, and are operable to move a pointer or needle 98 across the indicia on the scale member 90 to give a reading to an observer. As most often manufactured, the working assemblies 96 of meters are usually plated or housed in reflective shields. When desired, they can be coated with white paint instead of plating.

A light diffusing patch or coating 100 of somewhat greater lateral extent than the annular flange 88 is placed in optical contact with the rear surface of the light conducting panel 78 and another light diffusing coating 102 surrounds the portion of the cup-shaped housing 86 that extends beyond the rear surface of panel 78 and is in optical contact therewith.

As has been previously described, it is possible to mount various accessories such as buttons, switches, or knobs in the duo-panel system 76. One of these accessories can be the switch generally indicated as 72 which comprises a toggle switch 104 having a threaded forward portion 106 and a handle 108, said switch being mounted within an internally threaded bushing 110 made of translucent light diffusing material, preferably white or colored plastic. The bushing 110 has an annular flange portion at its forward end and this flange, along with opaque paint or plate 112 interposed between the toggle 104 and the rear surface of the panel 78, keeps the bushing tightly situated within the duo-panel system 76.

Another accessory which can be mounted in the duo-panel is shown as a push button generally indicated at 74. This push button can operate a micro-switch which includes a body 114 and a forwardly biased spring arm 116. A transparent or translucent bushing 118 of a structurally suitable plastic material such as some grades of nylon or other machinable plastic, is positioned within the duo-panel 76 forwardly of and in alignment with the micro-switch body and spring arm. Sometimes it is desired to make the bushing 118 out of metal and in such instances, the portions of its cylindrical walls passing through the panel 78 are highly perforated or slotted to permit the passage of light therethrough. The bushing 118 has an externally threaded extended rear portion 120 which extends beyond the rear surface of the panel 78. An internally threaded bracket 122 is attached between the rear portion 120 and the micro-switch 114, thereby mounting said micro-switch to the duo-panel 76. An annular flange portion on the forward end of the bushing 118 and the internally threaded portion of the bracket 122 keeps the bushing tightly situated within the duo-panel 76.

The rear portion 120 of the bushing 118 is provided with an internal shoulder 124 having a central aperture of smaller diameter than the main bushing aperture 126. A translucent light diffusing plastic push button, preferably made of a different color plastic then the bushing 118, is situated within the bushing aperture 126. The push button includes a head portion 128 of approximately the same diameter as the bushing aperture 126 and a depending stem portion 130 of approximately the same diameter as the aperture in the shoulder 124. The stem portion 130 extends beyond the end of the bushing rear portion 120 and is provided with an external rubber grommet 132 which limits the forward motion of the button in the bushing 118. A coil compression spring 134 surrounds the stem portion 130 and seats upon the internal shoulder 124 and the underside of the push button head 128, thus normally urging the push button outward beyond the forward end of the bushing 118. When the operator depresses the button, the end of the stem portion 130 contacts and moves the micro-switch spring arm 116, thus actuating the micro-switch.

A light producing means or source generally indicated as 136 is provided to transmit light through the duo-panel 76 and meter housing 86 to thereby illuminate the indicia on the meter scale 90 by diffuse light injected into the meter housing, then through the bushing 110 and 118 to thereby illuminate the accessories to facilitate their location in the dark. Fig. 5 shows the light producing means 136 as being located in four corners of the duo-panel 76 but it should be understood that any number of light producing means can be used depending upon the particular environmental requirements.

Figure 7:
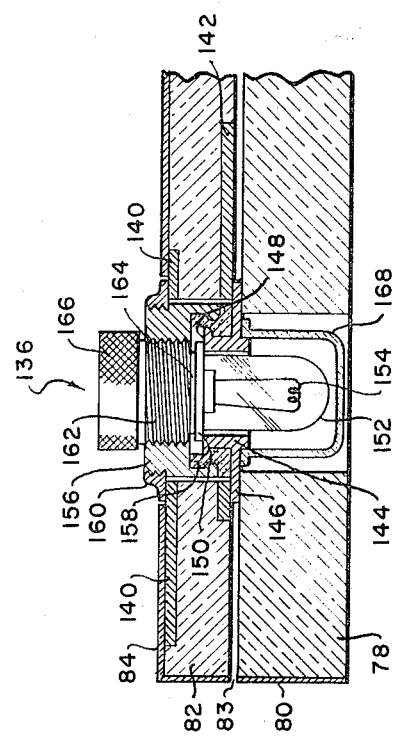
FIG. 7 is a fragmentary transverse sectional view showing in detail the light producing source of FIG. 5.

FIG. 7 shows the light producing means 136 in greater detail. Electric current is transmitted to the light producing means 136 by a pair of conductors 140 and 142 embedded in the top and bottom surfaces respectively of panel 82. The method of fabricating these conductors into the panel is described in greater detail in applicant's U.S. Patent No. 2,821,800. Each individual light producing means 136 includes an annular metal member 144 formed with a peripheral flange 146 that fits under and in electrical contact with the lower conductor 142 and with a top surface 148 adapted to receive in electrical contact a metal flange portion 150 of a miniature electric lamp 152. Flange 150 forms one conductor for a lamp filament 154. A second annular metal member 156 surrounds member 144 and is insulated therefrom by an insulating ring 158. Member 156 is threaded on its outer surface for reception of a threaded metal ferrule 160 and on its inner surface for reception of a threaded metal barrel 162 of the lamp, which threaded barrel forms a second conductor for the lamp filament 154. The ferrule 160 is screwed into the electrical contact with the upper conductor 140. The threaded portion 162 of the lamp is electrically insulated from the flange 150 by an insulator 164. A knurled knob 166, for removing the lamp assembly from the member 156, forms a top portion of the lamp assembly. A colored optical filter 168 may be provided, if desired, and can be clamped to the lower annular member 144.

When the light producing means 136 is energized, light rays pass therefrom into the duo-panel 76 wherein the light rays are reflected between the polished front and rear surfaces of the panel 78 by internal specular reflection. As the light rays are transmitted through the panel 78, they are also transmitted through the bushing 110, the bushing 118, the push button 128, and the meter body 86, all of which are pervious to light and all of which are mounted within the duo-panel 76. Also, certain of the light rays so transmitted through the light conducting panels 78 are diffused by the light diffusing coatings 100, 102 and are thus reflected through the meter body 86 and into the light diffusing scale member 90 for illuminating the indicia carried thereon.

Figure 8:
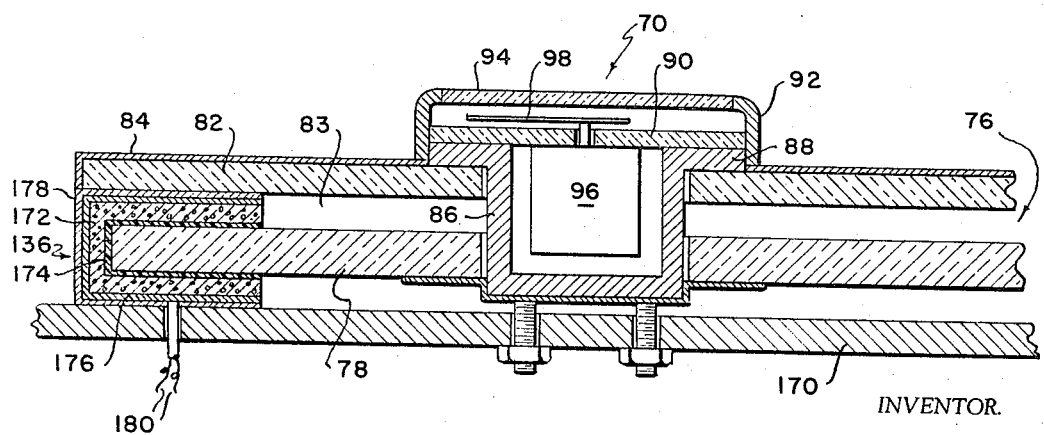
FIG. 8 is a fragmentary transverse sectional view of a duo-panel mounted meter similar to the meter of FIG. 6, but employing an electroluminescent light producing source.

FIG. 8 shows a duo-panel mounted meter, similar to that shown in FIG. 6, and being attached to some suitable metal plate 170 which can form the front surface of a metal test console or some other desirable location for mounting a duo-panel contained meter 70. The light source 136 for the embodiment of FIG. 8 comprises a laminated border or framework of electroluminescent material, which is placed around the periphery of the light conducting panel 78. Electroluminescent material, per se, is well known in the art and need not be described in detail here. However, for the purpose of illustration, the lamination can comprise a layer 172 of electroluminescent material such as phosphor granules embedded in a transparent plastic or glass matrix, and sandwiched between a transparent electrical conductor 174 and an opaque electrical conductor 176, with the outer or exposed surfaces covered with a sealing or protecting coating 178. A pair of leads or terminals 180 are connected to the conductors 174 and 176 and lead to and from a suitable source of A.C. current, not shown. The transparent conductor 174 may be formed of tin oxide, and may or may not be in optical contact with the light conducting panel 78, depending upon the construction desired. The opaque conductor 176 is preferably of a polished metal having good light reflecting properties.

It should be clear that the illumination panels 76 and 82 may be "tailor-made" to be just large enough to illuminate a single meter, a pair of meters, or any other desired number of meters, and may be so shaped in plan view as to lie substantially concealed between the meter and the metal console panel front surface, or may be so shaped to extend only slightly beyond the meter as shown in FIG. 2.

It can thus be seen that the present invention provides a novel means for illuminating a meter scale by mounting the meter within an edge illuminated panel and conveying light to the meter scale by virtue of the transparency of the meter case. This permits observation of the meter scale reading in total darkness as well as in daylight. This invention also provides a novel means for illuminating switches, knobs, buttons, and other accessories by surrounding them with translucent bushings which, when illuminated, provide means for ready location of the accessories even in total darkness. Finally, this invention provides a means for illuminating a meter which is to be mounted in a metal test console or housing without requiring substantial redesign of the console face plate.

It will be understood that various changes in the details, materials, steps and arrangements of parts, which have herein been described and illustrated in order to explain the nature of this invention, may be made by those skilled in the art within the principle and scope of the invention as expressed in the appended claims.

What is claimed is:
1. An illumination system for illuminating a meter mounted upon a control or display housing, comprising:
   a light conducting panel formed of a transparent light transmitting material and having substantially parallel polished front and rear surfaces operative to specularly reflect light rays therebetween;
   a meter, said meter having a meter dial plate juxtaposed to the front surface of said light conducting panel;
   said meter dial plate including light diffusing scale means superposed forwardly of the most rearward mounting surface of said meter and having indicia on its obverse surface;
   light diffusing means in optical contact with a surface of said light conducting panel and substantially congruent with and in alignment with said meter dial plate;
   means for attaching said meter and light conducting panel to said control or display housing; and
   light producing means located within said light conducting panel and energizable to transmit light rays through said panel wherein said light diffusing means diffusely reflects some of these transmitted rays through said panel front surface and into said scale means for illumination thereof, thus facilitating observation of the indicia on the obverse side of said scale means.

2. An illumination system as defined in claim 1 but further characterized by an opaque combination of coatings superimposed on the front surface of said light conducting panel in the region surrounding said meter.

3. An illumination system as defined in claim 1 but further characterized by a light diffusing panel juxtaposed to, but optically separated from, said light conducting panel front surface, and having a central aperture for meter reception.

4. An illumination system as defined in claim 3 but further characterized by an opaque combination of coatings superimposed on the front surface of said light diffusing panel in the region surrounding said meter.

5. As an article of manufacture, a meter illuminating accessory device to be installed between a non-illuminable panel and the mounting surfaces of an electric meter of the type having a light permeable housing, said device comprising:
   a light transmitting panel;
   light producing means located within said light transmitting panel near its peripheral edges and capable, upon energization, of transmitting light rays through said panel;

a light diffusing coating substantially surrounding said panel except for an uncovered portion on the front surface of said panel;

said uncovered portion being substantially congruent to the rear surface of said electric meter; and an external light masking coating covering said light diffusing coating whereby light rays from said panel are diffusely reflected out through the uncovered portion of said panel and into the meter for illumination thereof.

6. As an article of manufacture, a meter illuminating accessory device to be installed between a non-illuminable panel and the mounting surfaces of an electric meter of the type having a light permeable housing, said device comprising:

a light transmitting panel having an aperture therein substantialy congruent with said electric meter and extending at least partially through said panel;

light producing means located within said light transmitting panel near its peripheral edges and capable, upon energization, of transmitting light rays through said panel;

a light diffusing coating substantially surrounding said panel;

an external light masking coating covering said light diffusing coating;

said electric meter being mounted with at least a portion thereof being located within said panel aperture whereby light rays from said panel are diffusely reflected into said meter for illumination thereof.

7. As an article of manufacture, an illuminable duo-panel having means therein for illuminating a panel mounted accessory and comprising:

a light transmitting panel;

light producing means located within said light transmitting panel near its peripheral edges and capable, upon energization, of transmitting light rays through said panel;

a light diffusing panel formed of translucent material, substantially congruent to said light transmitting panel and juxtaposed to the front surface thereof but optically separated therefrom;

said panels each containing an aperture;

said apertures being in substantial alignment for reception of the accessory to be mounted within the duo-panel;

a translucent iluminable bushing means mounted within said apertures and having a flange portion of greater lateral extent than said apertures, thus preventing light leakage from said apertures while restraining said light transmitting and light diffusing panels together to form the duo-panel;

said bushing means having a central opening for receiving and mounting said accessory and positioning it within said duo-panel whereby when light rays from said light producing means are passed through said panel, said bushing means is illuminated thereby facilitating location of said accessory even when said duo-panel is in darkness.

8. An illumination means for illuminating a meter to be attached to a metal face plate, said means comprising:

a light conducting panel formed of a transparent light transmitting material and having substantially parallel polished front and rear surfaces operative to specularly reflect light rays therebetween;

a light reflecting coating surrounding the peripheral edges of said light conducting panel to prevent lateral light leakage therefrom;

a meter means juxtaposed to said light conducting panel front surface and having screw means extending rearwardly through said light conducting panel and said metal face plate for mounting said meter and panel to said face plate;

said meter means including a light pervious base plate juxtaposed to the front surface of said light conducting panel;

said meter means also including a translucent light diffusing meter scale juxtaposed forwardly of the most rearward mounting surface of said meter and having indicia on its obverse surface;

a pointer means movable relative to the indicia on said meter scale to give a meter reading to an observer;

a meter cover releasably engageable with said meter means and having a transparent portion therein to permit an observer to read the meter scale;

an opaque combination of coatings superimposed on the front surface of said light conducting panel in surrounding relationship to said meter means;

a light diffusing patch in optical contact with said light conducting panel rear surface and in substantial alignment with and congruity to said meter face plate;

light producing means located within said light conducting panel;

said light producing means including a plurality of electric lamps, each located in a cavity within said conducting panel;

each of said electric lamps being positioned within its cavity by being encapsulated in a transparent potting compound; and a pair of electric terminals embedded within said light conducting panel and adapted to connect each electric lamp with a suitable source of electric power whereby said lamps will be illuminated and will transmit light rays through said panel wherein said light diffusing patch will diffusely reflect some of the transmitted rays through the panel front surface and meter face plate and into the meter scale observer of the indicia on the obverse side of the meter scale.

9. An illumination means for illuminating a meter to be attached to a metal face plate, said means comprising:

a light conducting panel formed of a transparent light transmitting material and having substantially parallel polished front and rear surfaces operative to specularly reflect light rays therebetween;

an internally reflecting combination of coatings surrounding the peripheral edges of said light conducting panel to prevent lateral light leakage therefrom;

a light diffusing panel formed of transulcent material, substatnially congruent to said light conducting panel and juxtaposed to the front surface thereof but optically separated therefrom;

said light diffusing panel including a central aperture for reception of a meter;

a meter means mounted in said central aperture and having screw means extending rearwardly through said light conducting panel and said metal face plate for mounting said meter and said panels to said face plate;

said meter means including light transmitting base plate juxtaposed to the front surface of said light conducting panel;

said meter means also including a translucent light diffusing meter scale juxtaposed to said meter face and having indicia on its obverse surface;

a pointer means movable relative to the indicia on said meter scale to give a meter reading to an observer;

a meter cover releasably engageable with said meter means and having a transparent portion therein to permit an observer to read the meter scale;

an opaque combination of coatings superimposed on the front surface and side edge surfaces of said light diffusing panel in surrounding relationship to said meter means;

a light diffusing patch in optical contact with one of the principal surface of said light conducting panel and in substantial alignment with and congruity to said meter face plate;

light producing means located within said light conducting panel;

said light producing means including a plurality of electric lamps, each located in a cavity within said light conducting panel;

each of said electric lamps being positioned within its cavity by being encapsulated in a transparent potting compound; and a pair of electric terminals embedded within said light conducting panel and adapted to connect each electric lamp with a suitable source of electric power whereby said lamps will be illuminated and will transmit light rays through said light conducting panel wherein said light diffusing patch will diffusely reflect some of the transmitted rays through the front surface of the light conducting panel, through the meter face plate, and into the meter scale for illumination thereof, thus facilitating observation of the indicia on the obverse side of the meter scale.

10. A duo-panel illumination system for illuminating an internally mounted meter comprising:

a transparent light conducting panel having substantially parallel polished front and rear surfaces operative to specularly reflect light rays therebetween;

a translucent light diffusing panel juxtaposed to the front surface of said light conducting panel in optical separation therefrom;

said light conducting panel and said light diffusing panel each having a central aperture, said apertures being substantially coaxial;

a meter means mounted within said central apertures and having a transparent body;

said meter means body including an annular flange portion extending forwardly beyond said light diffusing panel and having a lateral extent greater than the diameter of said central apertures;

said meter means body also including a cup-shaped portion extending through said apertures and beyond the rear surface of light conducting panel;

said meter means also including a light diffusing translucent meter scale superposed forwardly of said annular flange portion and having indicia on its obverse surface;

a light diffusing patch in optical contact with one of the principal surfaces of said light conducting panel, said patch surrounding the central aperture of the light conducting panel and having a lateral extent substantially equivalent to the lateral extent of the annular flange portion;

a light diffusing coating in optical contact with the portion of the cup-shaped portion that extends beyond the rear surface of the light conducting panel; and light producing means for transmitting light rays through said light conducting panel wherein the light diffusing patch diffusely reflects some of the transmitted rays through the panels and through the annular flange portion and wherein the light diffusing coating diffusely reflects some of the transmitted rays through the cup-shaped meter body portion, said diffusely reflected rays entering said meter scale for illumination thereof, thus facilitating observation of the indicia on the side of the meter scale.

11. A duo-panel illumination system as defined in claim 10 wherein the light producing means is an electroluminescent means surrounding at least a portion of the periphery of the light conducting panel.

12. A duo-panel illumination system as defined in claim 10 but further characterized by an accessory illumination means in the form of a hollow translucent accessory containing means mounted within the duo-panel and extending completely through both of said panels.

13. A duo-panel illumination system for illuminating internally mounted meter and accessory means, said system comprising:

a light conducting panel formed of a transparent light transmitting material and having substantially parallel polished front and rear surfaces operative to specularly reflect light rays therebetween;

a light diffusing panel formed of translucent material, substantially congruent to said light conducting panel in optically separated juxtaposition therefrom;

each of said panels having a central aperture, said apertures being congruent and coaxial and thus defining a meter receiving cavity;

a meter means being contained within a generally transparent housing mounted within said meter receiving cavity;

said meter housing including an annular flange portion diametrically larger than said meter receiving cavity and a cup-shaped body portion diametrically smaller than said meter receiving cavity;

said annular flange portion extending forwardly of said duo-panel in juxtaposition to said light diffusing panel;

said cup-shaped body portion being mounted within said meter receiving cavity and extending rearwardly of said duo-panel beyond the rear surface of said light conducting panel;

said meter means also including a light diffusing translucent meter scale superposed to said annular flange portion and having indicia on its obverse surface;

a pointer means movable relative to the indicia on said meter scale to give a meter reading to an observer;

a meter cover releasably engageable with said meter means and having a transparent portion therein to permit an observer to read the meter scale;

an opaque combination of coatings superimposed on the front surface and side edge surfaces of said light diffusing panel in surrounding relationship to said annular flange portion;

a light diffusing patch in optical contact with the rear surface of said light conducting panel, said patch surrounding the central aperture of the light conducting panel and having a lateral extent substantially equivalent to the lateral extent of said annular flange portion;

a meter housing light diffusing coating in optical contact with the portion of the cup-shaped body which extends rearwardly of the duo-panel;

at least one accessory mounting means extending through the duo-panel and having a central accessory receiving bore therethrough;

said accessory mounting means comprising a translucent, light diffusing bushing having a portion extending forwardly of the duo-panel in juxtaposition to the light diffusing panel; and light producing means for transmitting light rays through said light conducting panel wherein some of said transmitted rays pass through said accessory mounting means thus illuminating it to facilitate location of the accessory, wherein some of the transmitted rays are diffusely reflected by the light diffusing patch through the duo-panel and through the meter annular flange, and wherein some of the transmitted rays are diffusely reflected by the meter housing light diffusing coating through the cup-shaped body portion of the meter housing, said diffusely reflected rays entering the meter scale for illumination thereof, thus facilitating observation of the indicia on obverse side of the meter scale.

14. A duo-panel illumination system as defined in claim 13 but further characterized by a peripheral light diffusing coating superimposed on the peripheral edges of said light conducting panel to prevent lateral light leakage therefrom.

15. A duo-panel illumination system as defined in claim 13 wherein the light producing means is an electroluminescent means surrounding at least a portion of the periphery of the light conducting panel.

References Cited by the Examiner
UNITED STATES PATENTS

| | | | |
|---|---|---|---|
| 2,278,520 | 4/1942 | Klein et al. | 116—129 |
| 2,518,726 | 8/1950 | Shlenker | 240—8.16 |
| 2,566,026 | 8/1951 | Hughes | 240—8.16 |
| 2,663,107 | 12/1953 | Moller et al. | 40—130 |
| 2,672,551 | 3/1954 | Hale et al. | 240—8.16 |
| 2,821,800 | 2/1958 | Hardesty | 240—8.16 |
| 2,824,399 | 2/1958 | Neugass | 40—130 |
| 2,831,282 | 4/1958 | Hardesty | 240—8.16 |
| 2,831,453 | 4/1958 | Hardesty | 116—129 |
| 2,835,789 | 5/1958 | Roper | 240—8.16 |
| 2,838,865 | 6/1958 | Hardesty | 240—8.16 |
| 2,843,079 | 7/1958 | Hunter et al. | 116—129 |
| 2,848,830 | 8/1958 | Dmitriev et al. | 40—130 |
| 2,886,911 | 5/1959 | Hardesty | 40—130 |
| 2,923,860 | 2/1960 | Miller | 240—8.16 |
| 2,945,313 | 7/1960 | Hardesty | 40—130 |
| 2,991,576 | 7/1961 | Roper | 240—8.16 |
| 3,027,668 | 4/1962 | Hardesty | 240—8.16 |
| 3,070,913 | 1/1963 | Miller | 240—2.1 |
| 3,113,197 | 12/1963 | Green | 240—2 |
| 3,154,251 | 10/1964 | Dupree et al. | 240—8.16 |

LOUIS J. CAPOZI, *Primary Examiner.*

JEROME SCHNALL, *Examiner.*